(12) United States Patent
Frankel et al.

(10) Patent No.: US 9,569,122 B2
(45) Date of Patent: Feb. 14, 2017

(54) SYSTEM, METHOD AND A NON-TRANSITORY COMPUTER READABLE MEDIUM FOR TRANSACTION AWARE SNAPSHOT

(71) Applicants: Amir Frankel, Tel Aviv (IL); Yechiel Yochai, Moshav Aviel (IL)

(72) Inventors: Amir Frankel, Tel Aviv (IL); Yechiel Yochai, Moshav Aviel (IL)

(73) Assignee: INFINIDAT LTD., Herzliya (IL)

( * ) Notice: Subject to any disclaimer, the term of this patent is extended or adjusted under 35 U.S.C. 154(b) by 690 days.

(21) Appl. No.: 13/915,645

(22) Filed: Jun. 12, 2013

(65) Prior Publication Data
US 2014/0372394 A1    Dec. 18, 2014

(51) Int. Cl.
*G06F 17/30* (2006.01)
*G06F 3/06* (2006.01)

(52) U.S. Cl.
CPC ........... *G06F 3/0619* (2013.01); *G06F 3/0665* (2013.01); *G06F 17/30088* (2013.01); *G06F 17/30227* (2013.01)

(58) Field of Classification Search
CPC ............ G06F 17/30371; G06F 11/1471; G06F 2201/80; G06F 2201/84; G06F 17/30312
See application file for complete search history.

(56) References Cited

U.S. PATENT DOCUMENTS

2006/0224636 A1\* 10/2006 Kathuria ............. G06F 11/1471
707/999.2

\* cited by examiner

*Primary Examiner* — Dinku Gebresenbet
(74) *Attorney, Agent, or Firm* — Reches Patents

(57) ABSTRACT

A method for generating transaction aware snapshots, the method may include: (a) starting a creation of a certain point in time snapshot for a consistency group that comprises at least one logical volume; (b) detecting that at the certain point in time there is an uncompleted transaction for writing multiple information units to the consistency group; the uncompleted transaction started at a transaction start point in time that precedes the certain point in time; (c) preventing an access to the certain point in time snapshot until a completion of the uncompleted transaction; and (d) associating the multiple information units with at least the certain point in time snapshot.

27 Claims, 11 Drawing Sheets

FIG. 5

Expose SN(n+1) 40 →

Dw1 61 | Un 71
Dw2 62 | Un 72
Dw3 63 | Un 73
Dw4 64 | Un 74
Dw5 65 | Un 75

T(n+1) 20
Tend 23
5

SYSTEM, METHOD AND A NON-TRANSITORY COMPUTER READABLE MEDIUM FOR TRANSACTION AWARE SNAPSHOT

BACKGROUND

A single logical operation (transaction) performed by an application may include several write operations (also referred to as writes) directed towards a disk layer of a storage system. For example, a filesystem that is hosted by an application layer of a storage system (or is hosted by a host computer that is coupled to the storage system) can perform file operations that involve writing data as well as writing metadata in the corresponding inode (inode being a metadata structure that includes metadata about the file). This may include writing new data to the file, adding pointers to the newly added data in a mapping data structure of the file, updating the size and timestamps of the file in its inode and optionally updating a timestamp of a parent directory.

The writes of a single transaction may be directed to a single logical volume or to a group of logical volumes (that form a consistency group). For example, the data of the file may be written in one logical volume while the metadata of the file may be written to a different logical volume of the same consistency group.

Storage systems may use various methods for keeping the integrity of the information they store. One method includes taking, at different points in time, snapshots of the same consistency group. The consistency group may include one or more logical volumes.

Snapshots of the same consistency group taken at different points of time are also referred as different snapshot versions. The term snapshot version refers to a unique identifier that uniquely identifies the specific snapshot at least among all the snapshots of the snapshot family of the same consistency group and is indicative of the time or order of creation relative to other snapshots in the family, for example, a newer snapshot is associated with a snapshot version that is larger than a snapshot version of an earlier created snapshot. The snapshot version may include for example a running index. Thus indexes 1, 2, . . . n may represent first till n'th snapshots (snapshot versions) SN(1), SN(2), . . . , SN(n) taken at points of time T(1), T(2), . . . T(n).

If a snapshot is taken between the writes of the transaction, the snapshot contains a partially executed transaction (incomplete transaction), which reflects an inconsistent state of the application stored data. A recovery based on such a snapshot can be erroneous. The inconsistency may exist whether the snapshot is of a single volume or the snapshot is of a group of volumes (that form a consistency group) involved in the transaction.

FIG. 1 is a timing diagram (1) that illustrates (a transaction inconsistent) snapshot version (n+1) {SN(n+1)} that includes data written by first till third writes of a transaction 8.

Version n snapshot (also referred to as SN(n)) was taken at time Tn 10. SN(n+1) was taken at time T(n+1) 20. SN(n+2) was taken at time T(n+2) 30.

Transaction 8 started at start point of time Tstart 11 and ends at Tend 23. Transaction 8 includes five writes—first till third writes taken at Tw1 12, Tw2 13, Tw3 14 (all between Tn 10 and T(n+1) 20) and fourth and fifth writes taken at Tw4 21 and Tw5 22 (between T(n+1) 20 and T(n+2) 30).

SN(n+1) includes only data corresponds to the first three writes of transaction 8 and thus is a transaction inconsistent snapshot.

FIG. 2 is a timing diagram 2 that illustrates a creation of transaction consistent snapshot at the expense of delaying the initialization of the creation of snapshots. Thus, SN(N+1) should have been taken at T(n+1) 20 but it was delayed (by delay 50) until transaction 8 is completed—and thus is actually taken at point of time T(n+1)' 20'. In addition, new transactions (not shown) that are initiated between T(n+1) 20 and T(n+1)' 20' are withheld until after SN(N+1) is taken at T(n+1)' 20'.

FIG. 2 may provide a partial representation of two known solutions for generating transaction consistent at the expense of delaying the initialization of the creation of snapshots and delaying the start of new transactions.

One known solution is called "Block and Drain", where the application blocks new transactions from users before a snapshot is taken, drains all pending writes, and when all pending writes are completed, a snapshot is taken (SN(n+1) taken at T'(n+1) 20' after being delayed by delay 50) and the blocking of new writes is removed. This causes a pause of up to few seconds in the workflow.

Another solution temporarily stores all the new incoming write requests in a temporary location, while draining pending writes and (once all pending writes are completed) taking a snapshot (SN(n+1) at T'(n+1) 20' after being delayed by delay 50). After the draining is completed and a snapshot is taken, the temporarily stored incoming write requests are executed. While the users are not restrained from sending write requests, there is still a pause in the normal workflow as well as implementation complications.

There is a growing need to provide a system, method and a computer readable medium for providing transaction consistent snapshots.

SUMMARY

According to an embodiment of the invention a method may be provided for generating transaction aware snapshots, the method may include starting a creation of a certain point in time snapshot for a consistency group that may include at least one logical volume; detecting that at the certain point in time there is an uncompleted transaction for writing multiple information units to the consistency group; the uncompleted transaction started at a transaction start point in time that precedes the certain point in time; preventing an access to the certain point in time snapshot until a completion of the uncompleted transaction; and associating the multiple information units with at least the certain point in time snapshot.

The method may include associating the multiple information units with a first snapshot that was created after the transaction start point in time.

The method may include tagging the multiple information units with at least the certain point in time snapshot.

The method may include tagging the multiple information units with a most recent snapshot of the consistency group that existed at the transaction start point of time.

The method may include associating the multiple information units with at least one snapshot of the consistency group that was created after a creation of the most recent snapshot of the consistency group that existed at the transaction start point of time.

The method may include associating information units, of the multiple information units, that were written to the consistency group after the certain point in time, with the certain point in time snapshot.

A first snapshot that is created after the transaction start point in time precedes the certain point in time snapshot. The method may include preventing access to the first snapshot that is created after the transaction start point in time and the certain point in time snapshot.

The method may include preventing by the storage system the access to the certain point in time snapshot until the completion of the uncompleted transaction.

The uncompleted transaction may be triggered by an application. The method may include preventing by the application the access to the certain point in time snapshot until the completion of the uncompleted transaction.

The method may include detecting that at the certain point in time there are a plurality of uncompleted transactions for writing information units to the consistency group; and preventing the access to the certain point in time snapshot until a completion of each of the plurality of the uncompleted transactions.

The method may include preventing a blocking of write requests.

The method may include completing the creation of the certain point of time snapshot.

The method may include tagging write requests that form the transaction with a most recent snapshot of the consistency group that existed at the transaction start point of time According to an embodiment of the invention a non-transitory computer readable medium may be provided that may store instructions for: starting a creation of a certain point in time snapshot of a consistency group that may include at least one logical volume; detecting that at the certain point in time there is an uncompleted transaction for writing information units to the consistency group; the uncompleted transaction started at a transaction start point in time; preventing an access to the certain point in time snapshot until a completion of the uncompleted transaction; and associating content that was written during the entire transaction with a first snapshot that was created after the transaction start point in time.

The non-transitory computer readable medium may store instructions for associating the multiple information units with a first snapshot that was created after the transaction start point in time.

The non-transitory computer readable medium may store instructions for tagging the multiple information units with at least the certain point in time snapshot.

The non-transitory computer readable medium may store instructions for tagging the multiple information units with a most recent snapshot of the consistency group that existed at the transaction start point of time.

The non-transitory computer readable medium may store instructions for associating the multiple information units with at least one snapshot of the consistency group that was created after a creation of the most recent snapshot of the consistency group that existed at the transaction start point of time.

The non-transitory computer readable medium may store instructions for associating information units, of the multiple information units, that were written to the consistency group after the certain point in time, with the certain point in time snapshot.

A first snapshot that is created after the transaction start point in time precedes the certain point in time snapshot. The non-transitory computer readable medium may store instructions for preventing access to the first snapshot that is created after the transaction start point in time and the certain point in time snapshot.

The non-transitory computer readable medium may store instructions for preventing by the storage system the access to the certain point in time snapshot until the completion of the uncompleted transaction.

The uncompleted transaction may be triggered by an application. The non-transitory computer readable medium may store instructions for preventing by the application the access to the certain point in time snapshot until the completion of the uncompleted transaction.

The non-transitory computer readable medium may store instructions for detecting that at the certain point in time there are a plurality of uncompleted transactions for writing information units to the consistency group; and preventing the access to the certain point in time snapshot until a completion of each of the plurality of the uncompleted transactions.

The non-transitory computer readable medium may store instructions for preventing a blocking of write requests.

The non-transitory computer readable medium may store instructions for completing the creation of the certain point of time snapshot.

The non-transitory computer readable medium may store instructions for tagging write requests that form the transaction with a most recent snapshot of the consistency group that existed at the transaction start point of time According to an embodiment of the invention there may be provided a storage system that may include: a snapshot controller that is arranged to start a creation of a certain point in time snapshot of a consistency group that may include at least one logical volume; detect that at the certain point in time there is an uncompleted transaction for writing information units to the consistency group; the uncompleted transaction started at a transaction start point in time; prevent an access to the certain point in time snapshot until a completion of the uncompleted transaction; and associate content that was written during the entire transaction with a first snapshot that is created after the transaction start point in time.

The snapshot controller may be arranged to associate the multiple information units with a first snapshot that was created after the transaction start point in time.

The snapshot controller may be arranged to tag the multiple information units with at least the certain point in time snapshot.

The snapshot controller may be arranged to tag the multiple information units with a most recent snapshot of the consistency group that existed at the transaction start point of time.

The snapshot controller may be arranged to associate the multiple information units with at least one snapshot of the consistency group that was created after a creation of the most recent snapshot of the consistency group that existed at the transaction start point of time.

The snapshot controller may be arranged to associate information units, of the multiple information units, that were written to the consistency group after the certain point in time, with the certain point in time snapshot.

A first snapshot that is created after the transaction start point in time precedes the certain point in time snapshot. The storage system (for example—the snapshot controller) may be arranged to prevent access to the first snapshot that is created after the transaction start point in time and the certain point in time snapshot.

The storage system (for example—the snapshot controller) may be arranged to prevent the access to the certain point in time snapshot until the completion of the uncompleted transaction.

The uncompleted transaction may be triggered by an application. The storage system (for example—the snapshot controller) may be arranged to prevent by the application the access to the certain point in time snapshot until the completion of the uncompleted transaction.

The snapshot controller may be arranged to detect that at the certain point in time there are a plurality of uncompleted transactions for writing information units to the consistency group; and preventing the access to the certain point in time snapshot until a completion of each of the plurality of the uncompleted transactions.

The snapshot controller may be arranged to prevent a blocking of write requests.

The snapshot controller may be arranged to complete the creation of the certain point of time snapshot.

The snapshot controller may be arranged to tag write requests that form the transaction with a most recent snapshot of the consistency group that existed at the transaction start point of time

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 5 illustrates write content and associated snapshot information according to an embodiment of the invention;

Figure 1:
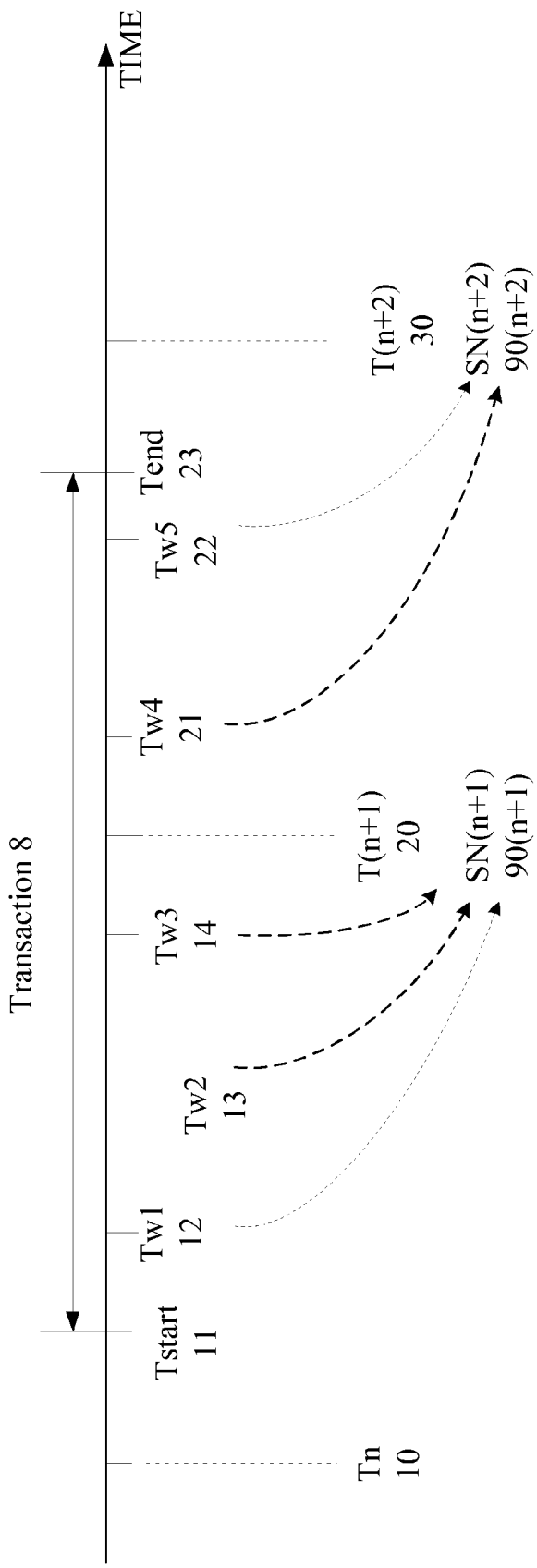
FIG. 1 is a timing diagram of a prior art snapshot creation process.
Figure 2:
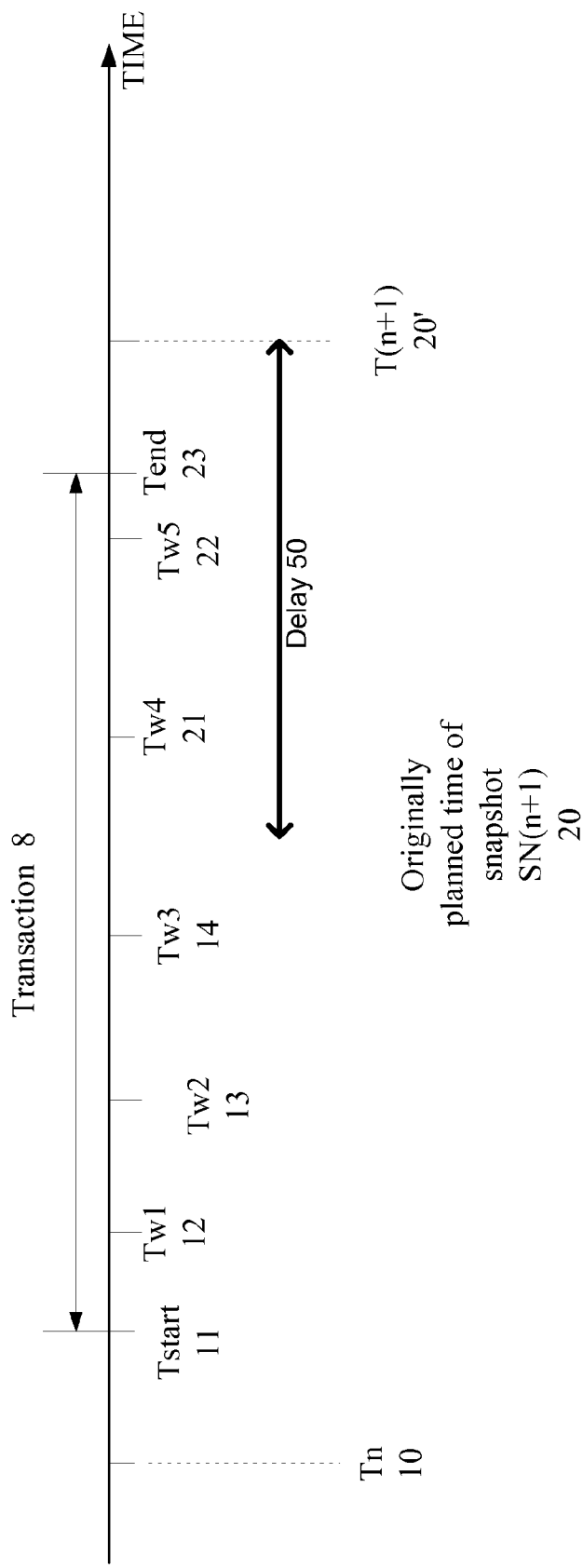
FIG. 2 is a timing diagram of a prior art snapshot creation process

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

According to an embodiment of the invention there may be provided a storage system, a method that are arranged to The terms "write" and "write request" are used in an interchangeable manner.

A "consistency group" may include one or more logical volumes. The terms "consistency group" and "logical volume" are used in an interchangeable manner.

Figure 3:
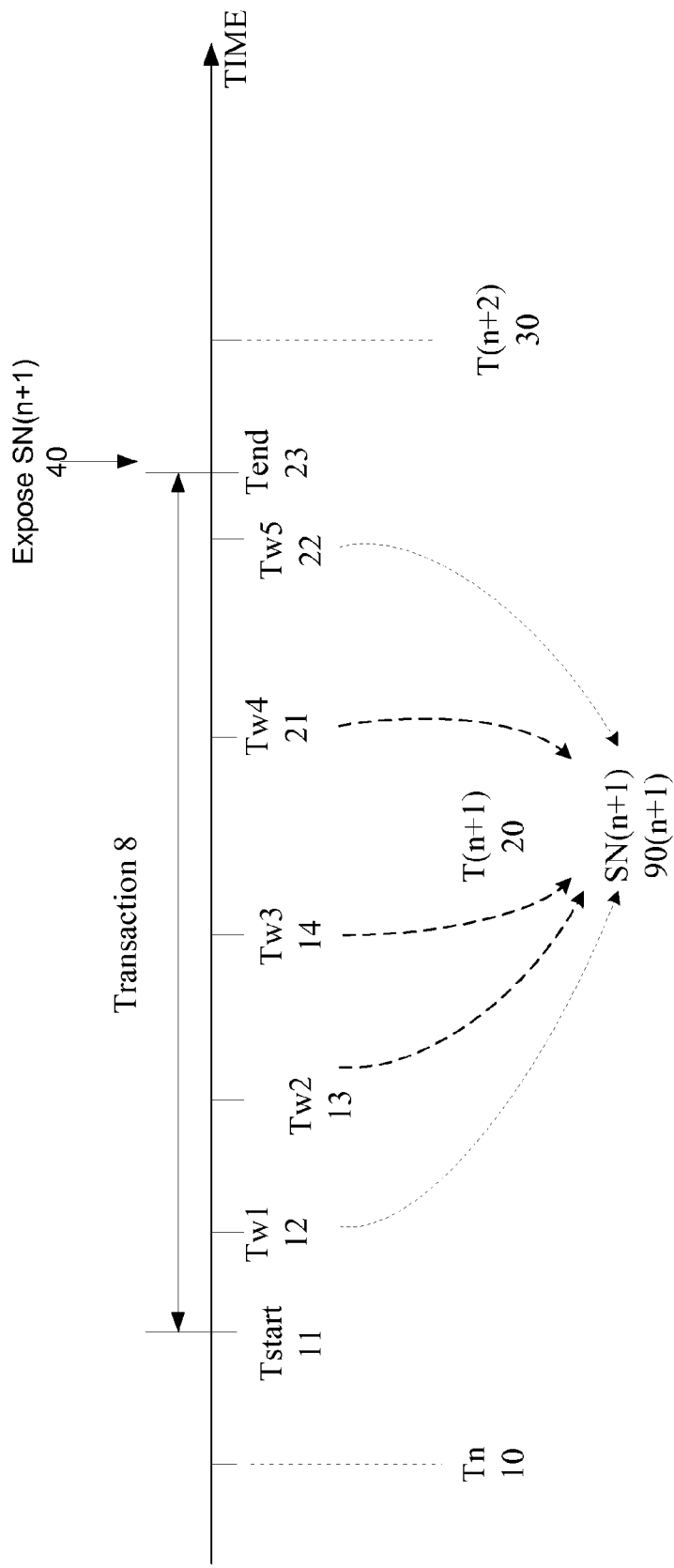
FIG. 3 is a timing diagram of a snapshot creation process according to an embodiment of the invention.

According to embodiments of the present invention, a snapshot (such as SN(n+1) of FIG. 3) is taken without delay (according to the snapshot schedule) and without blocking write requests directed to the logical volume being snapshot, regardless of any uncompleted transactions and probably in the middle of some (ongoing) uncompleted transactions (such as transaction 8 of FIG. 3).

The preventing of blocking may include preventing blocking of write requests of transactions aimed to the consistency group and started after the certain point in time. The data of these transactions is not to be associated with the certain point in time snapshot, but with snapshots created after the starting of these transactions. The preventing of blocking may include preventing a withholding from performing of write requests.

Nevertheless, the data written after the point of time T(n+1) of SN(n+1), by later incoming writes (e.g. fourth and fifth writes of transaction 8) of an incomplete transaction can be associated with (or at least are determined to be potentially allegeable to be included in) at least one snapshot that has its time of creation during the execution of the transaction- and may be associated with at least the first snapshot taken after the start point of time (Tstart 11) of the transaction (in FIG. 3 this snapshot is SN(n+1)), and with any following snapshots, even if this snapshot is taken before the incoming of these later writes. SN(n+1) is not exposed until all uncompleted transactions, directed to the logical volume being snapshot, are completed—thereby providing SN(n+1) that is consistent with regard to the transactions. Data that is associated with a certain snapshot may be associated with snapshots that follow the certain snapshot—unless the content of the logical addresses relating to the data is re-written by a later write request.

According to an embodiment of the invention there is provided a method that may include the following steps:

A. Each write operation of a transaction is tagged with the most recent snapshot version that exists at the time the transaction started. This tag accompanies each write request included in the transaction, so as to indicate that the data to be written by each of the write requests included in the transaction is to be associated with the snapshot(s) that follows the most recent snapshot that exists at the time the transaction started. Referring to FIGS. 3 and 5, first till third writes of transaction 8 occurred at Tw1-Tw3 12-14—after SN(n) was taken (after Tn 10)—and before SN(n+1) was taken—and their data (Dw1-Dw3 61-63 in FIG. 5) is tagged as being associated with snapshots that may follow snapshot SN(n)—as indicated by metadata ">n" 71-73 in FIG. 5. At these points of time SN(n+1) still did not occur and thus the data written by the first till third writes cannot be tagged with SN(n+1).

B. When SN(n+1) is taken, transaction 8 is incomplete. Thus—SN(n+1) is kept invisible and inaccessible until all incomplete transactions are ended.

C. Before the completion of transaction 8 but between T(n+1) 20 and T(n+2) 30, fourth and fifth writes of transaction 8 occur (at Tw4-Tw5 21-22)—and their data (Dw4-Dw5 64-65) can be tagged with snapshots that follow SN(n)—including SN(n+1). This may include tagging the data with snapshots that follow S(n)—as illustrated by metadata 74 and 75 (">n") of FIG. 5.

D. Once transaction 8 ends (Tend 23) or after the last write of transaction 8 is executed, SN(n+1) can be exposed (denoted "Expose S(n+1) 40" in FIGS. 3 and 5).

Figure 4:
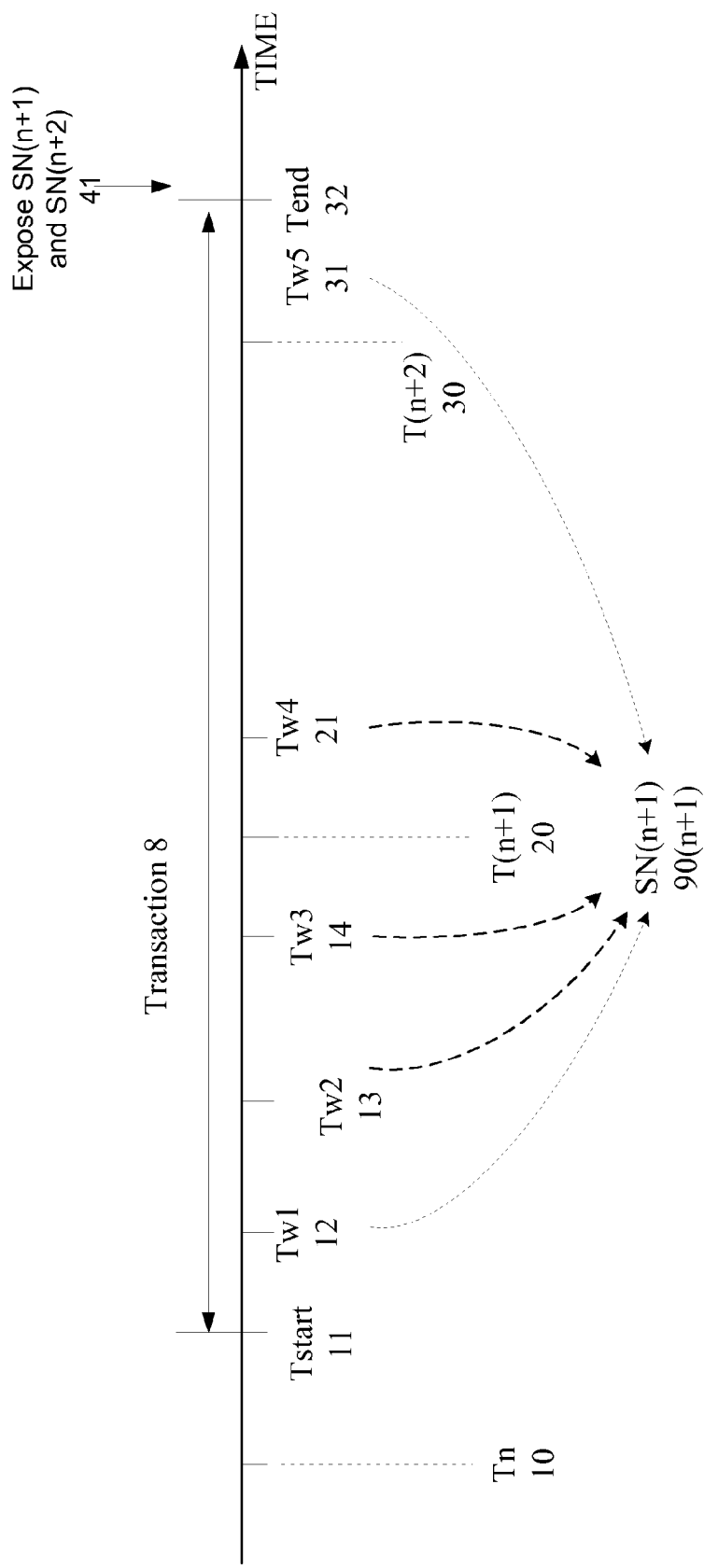
FIG. 4 is a timing diagram of a snapshot creation process according to an embodiment of the invention.

FIG. 4 differs from FIG. 3 by having the transaction 8 span over multiple snapshots—Tstart 11 is between Tn 10 and T(n+1) 20 while Tend 32 is between T(n+2) 20 and T(n+3) (not shown). The fourth write is executed (Tw4 21) between T(n+1) 20 and T(n+2) 30 and fifth write is executed (Tw5 31) after T(n+2) 30 (and before T(n+3)—not shown).

As indicated above a new transaction may be tagged with the most recent snapshot version that existed when the transaction started of a consistency group that includes one or more logical volumes. This tagging means that the data written during the new transaction may be associated with snapshots of the consistency group that follow the most recent snapshot version that existed when the transaction started. For example, the data written during transaction 8 may be tagged with S(n) (see metadata 71-75 ">n") and this means that they may be associated with snapshots that follow SN(n).

Tagging the transaction with a snapshot version, can be implemented either by the application or by the storage system.

Figure 6:
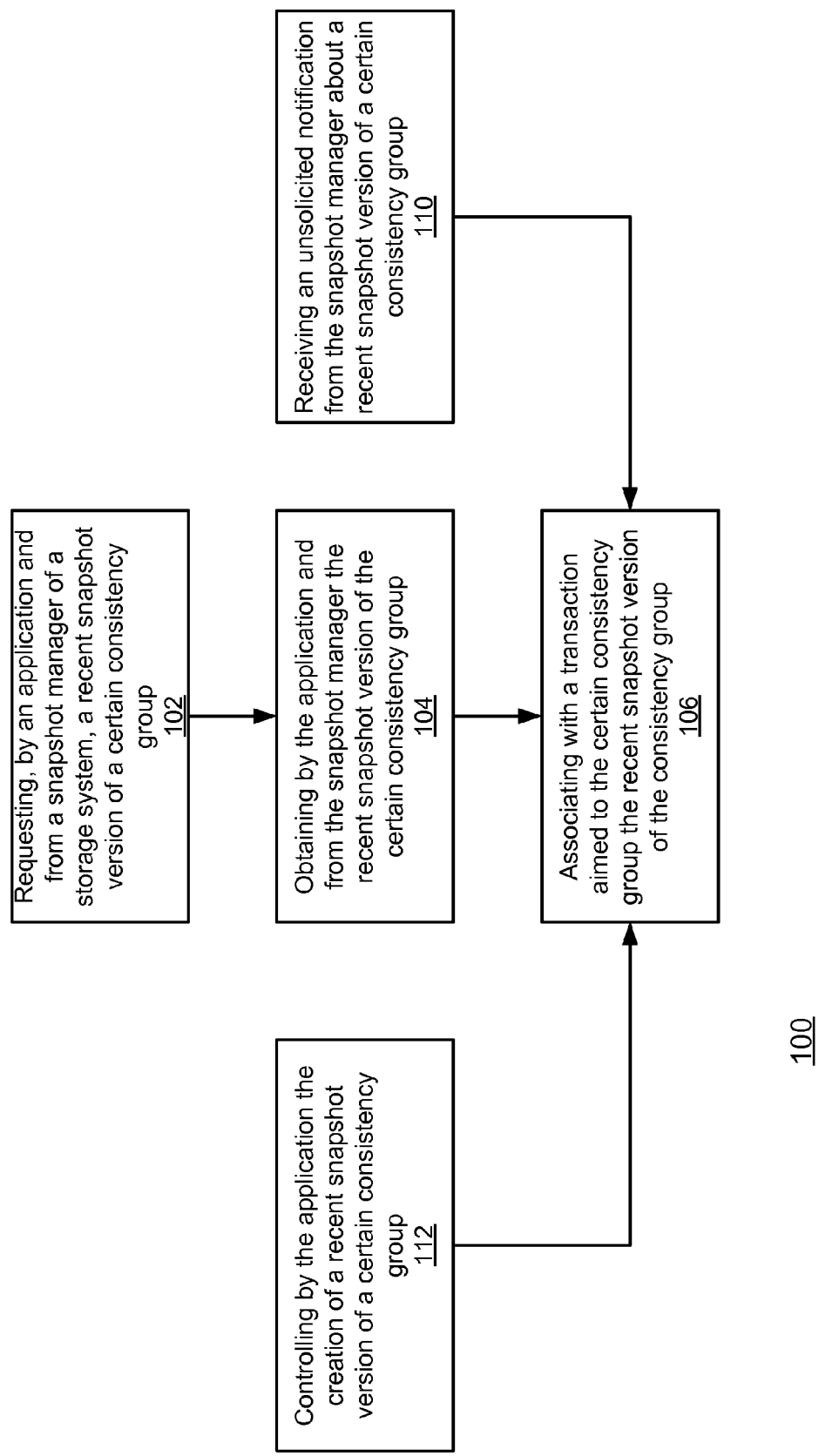
FIG. 6 illustrates a method according to an embodiment of the invention.

Tagging the transaction with the snapshot version, by the application, is illustrated in method 100 FIG. 6.

Method 6 includes various alternative stages such as stages 110, 112 and the combination of stages 102 and 104. Stages 104, 110 and 112 are followed by stage 106.

The application obtains the recent snapshot version (which becomes 'transaction associated snapshot version') prior to starting the transaction or upon starting the transaction. The application adds to each subsequent write request (that is included in the transaction) the transaction associated snapshot version (see, for example metadata 71-75 appended to content 61-65).

The obtaining of the recent snapshot version can be implemented using various techniques, non-limiting examples for obtaining the recent snapshot version are provided below.

The application may request (102) the current snapshot version from a snapshot controller of the storage system (or from another entity such as a control layer of the storage system), and gets the response (104) before starting the transaction (e.g. a dedicated message) or may request the recent snapshot version upon starting the transaction (e.g. an indication in the first write request, requesting to report the recent snapshot version in response to the write request). This may be followed by tagging (106) the transaction with the recent snapshot version. The tagging may include adding to each write request included in the transaction, the obtained recent snapshot version.

The storage system may, without being requested by the application, notify (110) the application upon each created snapshot. The application uses the latest reported snapshot version as the transaction associated snapshot version of a new transaction.

The application may master (112) the snapshot creation (i.e. instructs the storage system to create snapshots) and therefor naturally being aware of the recent snapshot version.

According to another embodiment, tagging the transaction with the most recent snapshot version (at the start of the transaction) is performed by the storage system and the application need not be aware of the recent snapshot version. In this embodiment, the application may provide a unique transaction identifier (unique among all transactions of the application or among all transaction in the system) with each write request included in the transaction. Optionally, the application notifies the storage system about the start of transaction along with the logical volume identifier (or an identifier of a consistency group, which is a group of several related volumes) and the transaction identifier. The notification can be a dedicated start-of-transaction message or can be an indication included in the first write request of a transaction for this write request being a first in a sequence of writes that compose a transaction.

When the storage system receives a start-of-transaction notification with a new transaction identifier or when the system receives a write request that includes an unknown new transaction identifier (in which case it can assume this is a first write in a new transaction), it tags the transaction with the most recent snapshot version by correlating the new transaction identifier with the most recent snapshot version (e.g. version n) of the specific logical volume and saves this transaction-snapshot pair in a lookup table used for translating identifiers of open transactions performed on the specific volume into the correlated snapshot version. Each time the storage system receives a write request that includes a transaction identifier, the storage system can look up the transaction identifier for the correlated snapshot version. If the lookup fails (e.g., in case where the transaction identifier is not yet known), the system adds a new entry for the new transaction paired with the most recent snapshot version. This tag may not be updated during the entire transaction—in order to assist in the creation of the transaction aware snapshot.

Figure 7:
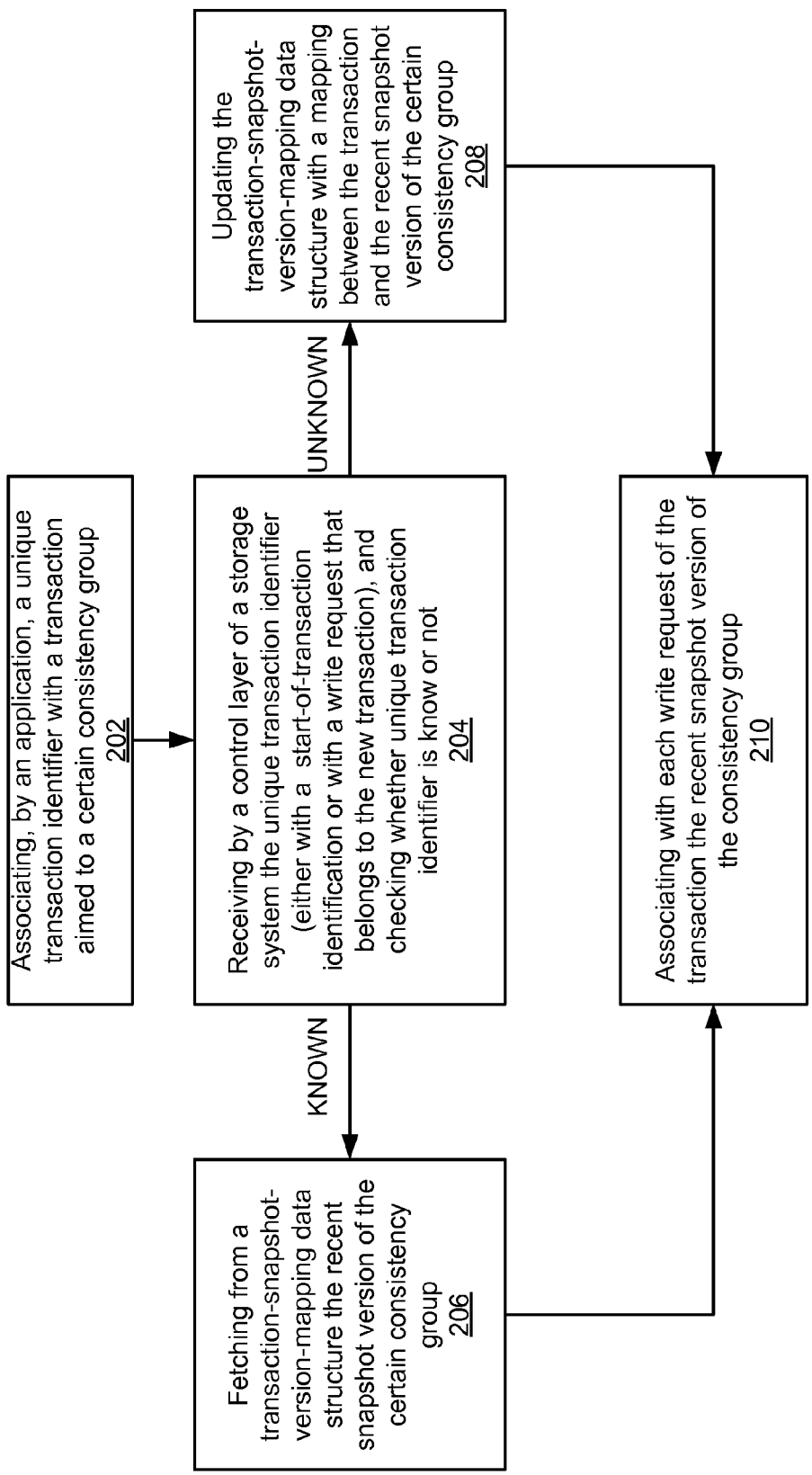
FIG. 7 illustrates a method according to an embodiment of the invention.

Tagging the transaction with the snapshot version, by the storage system is illustrated in method 200 FIG. 7.

Method 200 may start by stage 202. Stage 202 may be followed by query stage 204. Query stage 204 may be followed by stage 206 (in case of an already known unique transaction identifier) or 208 (in case of an unknown unique transaction identifier). Stage 206 and 208 are followed by stage 210.

Stage 202 may include associating, by an application, a unique transaction identifier with a transaction aimed to a certain consistency group.

Stage 204 may include receiving by a control layer of a storage system the unique transaction identifier (either with a start-of-transaction identification or with a write request that belongs to the new transaction), and checking whether unique transaction identifier is known or not.

If the transaction identifier is known, stage 206 may include fetching from a transaction-snapshot-version translation data structure the snapshot version of the certain consistency group that is correlated to the transaction identifier.

If the transaction identifier is not known, stage 208 may include updating the transaction-snapshot-version translation data structure with a translation between the transaction identifier and the recent snapshot version of the certain consistency group.

Stage 210 may include caching the data included in each write request of the transaction along with the tag indicative of the snapshot version of the consistency group that was paired with the transaction in stage 208. The cached data of the transaction and/or the data written to disk drives, may be associated with one or more snapshots that were created during the transaction and have a snapshot version that is greater than the so-called transaction associated snapshot version (such as SN(n)).

Creating a new snapshot during a transaction.

At a certain point in time, in between the write requests, the storage system creates a new snapshot, e.g. S(n+1)—either upon receiving a command from the application or from a user or periodically-triggered/time-synchronized snapshotting. The snapshot may be of a logical volume or of a consistency group of multiple logical volumes.

A check is made whether there are any incomplete transactions correlated with a previous snapshot, (for example SN(n) or even an earlier snapshot).

As long as at least one incomplete transaction is correlated with the previous snapshot version, the new snapshot is inconsistent and therefor it is hidden from the user and is inaccessible to third parties such as the application or the end-user. Thus—the third party cannot read this snapshot, use it for restoring the volume, cannot create another snapshot of the same volume, nor can he perform any other management command related to the hidden snapshot.

The check for the incomplete transactions and the hiding of the inconsistent snapshot can be managed by the application, especially when the application is aware of each snapshot creation.

According to another embodiment, the storage system is responsible for checking incomplete transactions and for hiding the inconsistent snapshot. The storage system can check the existence of such incomplete transactions, by checking whether the transaction-snapshot lookup table does not include any entry for the previous snapshot version.

Alternatively, the system can maintain a transaction counter for each snapshot version that is incremented upon each respective start-of-transaction notification and decremented upon each respective end-of-transaction notification. When the transaction counter reaches zero, there are no more incomplete transactions associated with the respective snapshot version.

Write commands of transactions that start from this point onward are tagged with the new snapshot version, e.g. SN(n+1), even if this snapshot is still hidden.

Managing transaction's write requests

As detailed above, the application adds to each write request either one of: (i) transaction associated snapshot version; (ii) the unique transaction identifier. In the latter case the storage system can translate, using the lookup table, the unique transaction identifier into the transaction associated snapshot version.

The storage system caches the data included in the write request along with the transaction associated snapshot version. When the data is destaged from the cache to the storage space (one or more disk drives), the destaged data is mapped into the logical volume addressed by the write request and in addition, the data is mapped to one or more snapshots that was/were created during the transaction, i.e. a snapshot having a snapshot version that is greater than the transaction associated snapshot version. If the transaction associated snapshot version is older than the most recent snapshot version (e.g. as in writes 4.5)—the storage system may associate the data of the write request to the newly created (and still hidden) snapshot version (e.g. SN(n+1)).

Associating the data of the write request with the newly created snapshot version means that the data is being included as part of the snapshot, for example, the associating can include writing the data to the snapshot, in case where the data is not to be shared with a newer version or the logical volume itself.

The data to be written may however be shared between the hidden snapshot SN(n+1) and the logical volume.

If the data is shared between the hidden snapshot and the logical volume, then it is written to the storage space only once and the associating of the data to the newly created snapshot version may only include adding an entry to an address mapping structure related to the hidden snapshot, wherein the entry includes a logical address within the snapshot and the physical address in the storage space, where the shared data is written to. According to another embodiment, in cases where writing to the cache memory is considered as a completed write (that is acknowledged to the application after writing to the cache), the associating of the data to the newly created snapshot version may include caching the data along with the transaction associated snapshot version, For example, the fifth write of transaction 8 arrives and it is determined to be tagged with SN(n) (even though the most recent snapshot version is newer SN(n+1)), and when the data of the fifth write is destaged from the cache to the storage device, the data will be associated with at least one snapshot having a version that is larger than the transaction associated snapshot version. Since, the fifth write is associated with SN(n), the data of the fifth write should be associated with a snapshot that exceeds SN(n)—including SN(n+1).

End of Transaction

Upon the completion of the transaction, a check can be made whether this is the last incomplete transaction associated with the respective snapshot version. If there are no more incomplete transactions associated with the respective snapshot version, the hidden snapshot is exposed to the user, meaning, it becomes accessible.

As was discussed for snapshot creation, either the application or the storage system can perform these steps.

In case where it is the responsibility of the storage system to expose the consistent snapshot, the application may notify an end of transaction to the storage system (either by a dedicated message or by including an end-of-transaction indication in the last write request). The storage system removes the transaction from its lists (or decrease the transaction counter).

A completion of a transaction is defined when all the write requests of the transactions are handled. A handled write request is a write request that was sent from the application to the storage system and received an acknowledgement from the storage system that the write request is safely saved. A safely saved write request can be a write request whose data has been saved in the physical storage space (e.g. a disk drive), but this is not necessarily so and a safely saved write request can be a write request whose data was cached in a cache memory and in addition, for protection purposes was further cached in a cache memory of a redundant server. Alternatively, the data can be cached in a non-volatile memory, e.g., non-volatile RAM (NVRAM) or Solid State Drive (SSD) and need not be duplicated to a redundant server. After safely caching the data, an acknowledgment is sent to the application.

Figure 8:
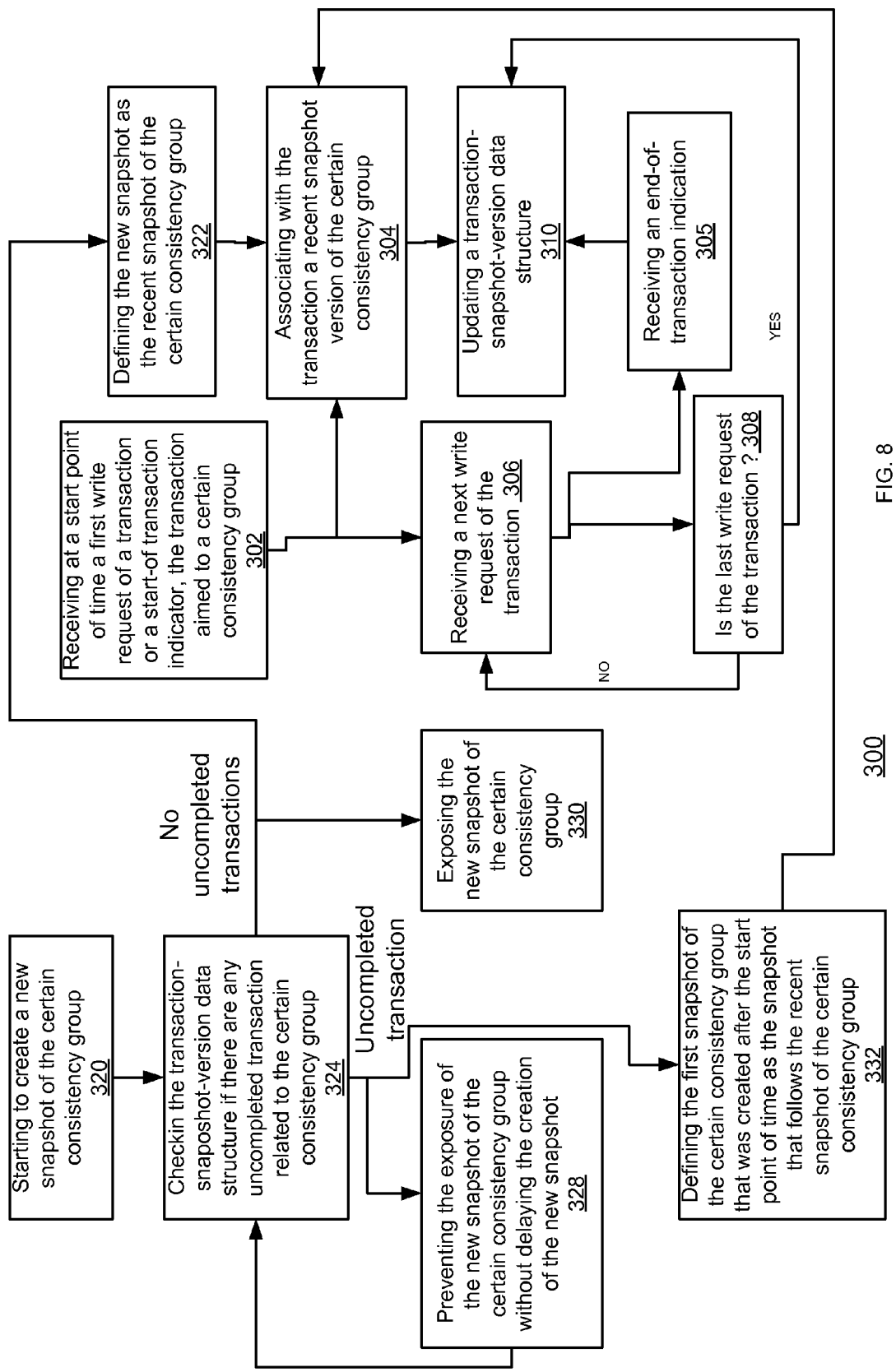
FIG. 8 illustrates a method according to an embodiment of the invention.

FIG. 8 illustrates method 300 according to an embodiment of the invention.

Method 300 may start by stage 302 of receiving at a start point of time a first write request of a transaction or a start-of transaction indicator, the transaction aimed to a certain consistency group.

Stage 302 may be followed by stages 304 and 306.

Stage 304 may include tagging (or correlating) the transaction with a recent snapshot version of the certain consistency group.

Stage 304 may be followed by stage 310 of updating a transaction-snapshot-version data structure.

Stage 306 may include receiving a next write request of the transaction.

Stage 306 may be followed by stages 305 and 308.

Stage 305 may include receiving an end-of-transaction indication.

Stage 305 may be followed by stage 310.

Stage 308 may include checking if the received write is the last write of the transaction.

Stage 308 may be followed by stage 306 (if it is not the last write of a transaction) or by stage 310 (if it is the last write of the transaction).

Method 300 may also include stage 320 of starting to create a new snapshot of the certain consistency group.

Stage 320 may be followed by stage 324 of checking the transaction-snapshot-version data structure if there are any uncompleted transaction related to the certain consistency group.

If there are no uncompleted transactions then stage 324 may be followed by stages 330 and 322.

Stage 330 may include exposing the new snapshot of the certain consistency group.

If there is at least one uncompleted transaction then stage 324 may be followed by stages 330 and 332.

Stage 328 may include preventing the exposure of the new snapshot of the certain consistency group without delaying the creation of the new snapshot.

Stage 328 may be followed by stage 324.

Stage 332 may include defining the first snapshot of the certain consistency group that was created after the start point of time as the snapshot that follows the recent snapshot of the certain consistency group.

Stage 332 may be followed by stage 304.

Figure 9:
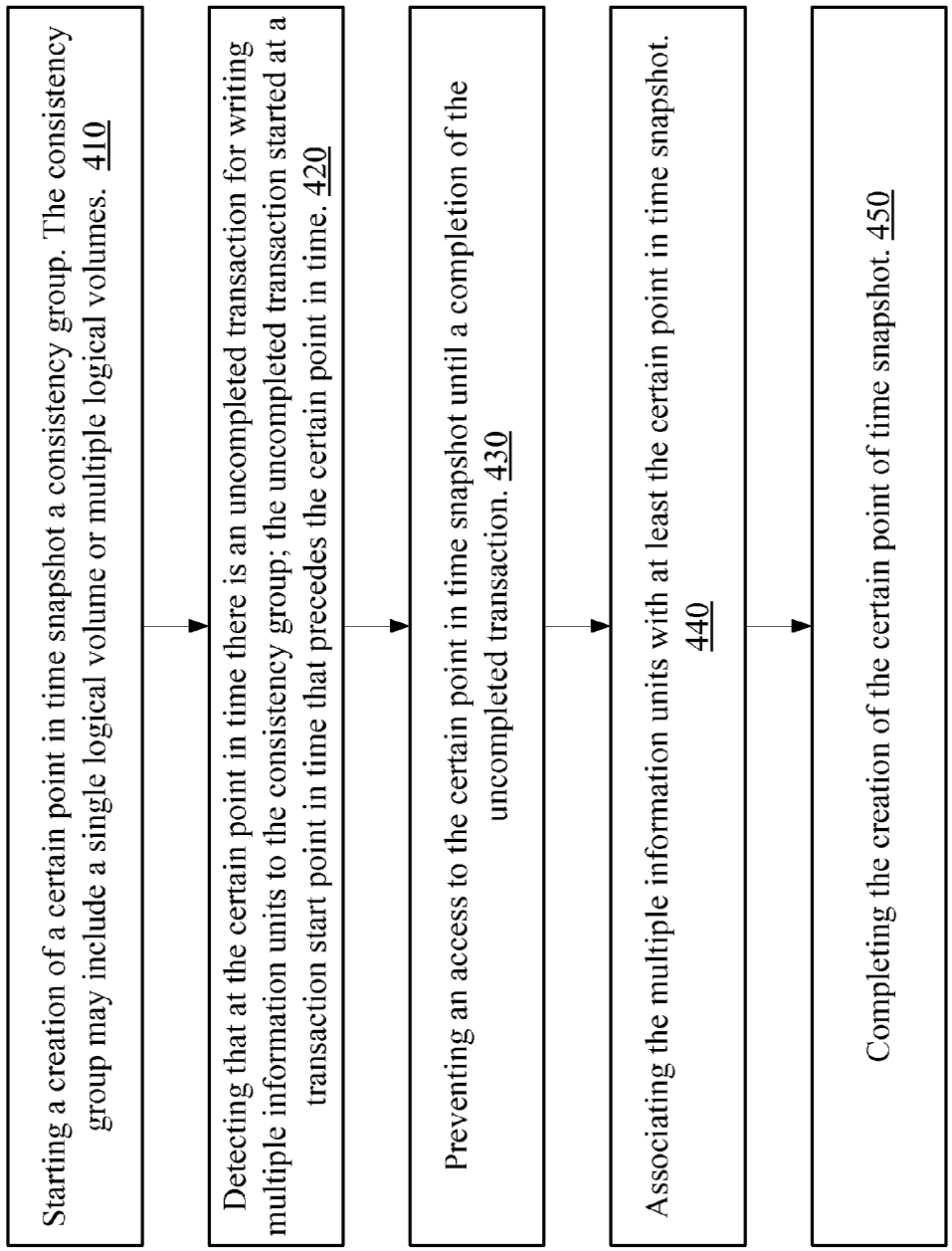
FIG. 9 illustrates a method according to an embodiment of the invention.

FIG. 9 illustrates method 400 according to an embodiment of the invention.

Method 400 includes a sequence of stages 410, 420, 430, 440 and 450.

Stage 410 may include starting a creation of a certain point in time snapshot of a consistency group. The consistency group may include a single logical volume or multiple logical volumes. The creation of the certain point in time snapshot is started even if there is an uncompleted transaction (or there are multiple uncompleted transactions) aimed to the certain consistency group. The creation of the certain point in time snapshot is not delayed due to the existence of one or more uncompleted transactions aimed to the certain consistency group.

Stage 420 may include detecting that at the certain point in time there is an uncompleted transaction for writing multiple information units to the consistency group.

The uncompleted transaction started at a transaction start point in time that preceded the certain point in time. An incomplete transaction is a transaction that includes at least one write request that occurred before the certain point in time and at least one remaining write request that will occur after the certain point in time.

Stage 430 may include preventing an access to the certain point in time snapshot until a completion of the uncompleted transaction. If there are a plurality of uncompleted transactions aimed to the certain consistency group then stage 430 may include preventing the access to the certain point in time snapshot until all of these plurality of transactions are completed.

Stage 440 may include associating the multiple information units (including one or more information units written after the certain point in time) with at least the certain point in time snapshot.

Stage 450 may include completing the creation of the certain point of time snapshot.

The first snapshot that is created after the transaction start point in time can be the certain point in time snapshot (see, for example, FIG. 3) and stage 440 may include associating content that was written to the consistency group after the certain point in time with the certain point in time snapshot.

Stage 440 may include associating the content that was written to the consistency group after the certain point in time with at least one snapshot of the consistency group that follows the certain point in time snapshot. A snapshot controller can, when each further snapshot is created, to determine whether that content is still relevant.

The first snapshot that is created after the transaction start point in time may precede the certain point in time snapshot. Referring to FIG. 4—the certain point in time snapshot is SN(n+2) 90 taken at T(n+2) 30 and the first point in time snapshot taken after start point of time Tstart 11 is SN(n+1) 90(n+1) taken at T(n+1) 20. In this case stage 430 may include preventing access to SN(n+1) and to SN(n+2) until after transaction 8 is completed. If the transaction is open during a plurality of snapshots then all of the plurality of snapshots are not exposed until the transaction is completed.

Each one of stages 410 and 430 can be controlled and/or executed by the storage system, by a control layer of a storage system, by a snapshot controller, by an application hosted by a host computer, by an application hosted by an application layer of the storage system, and the like.

Figure 10:
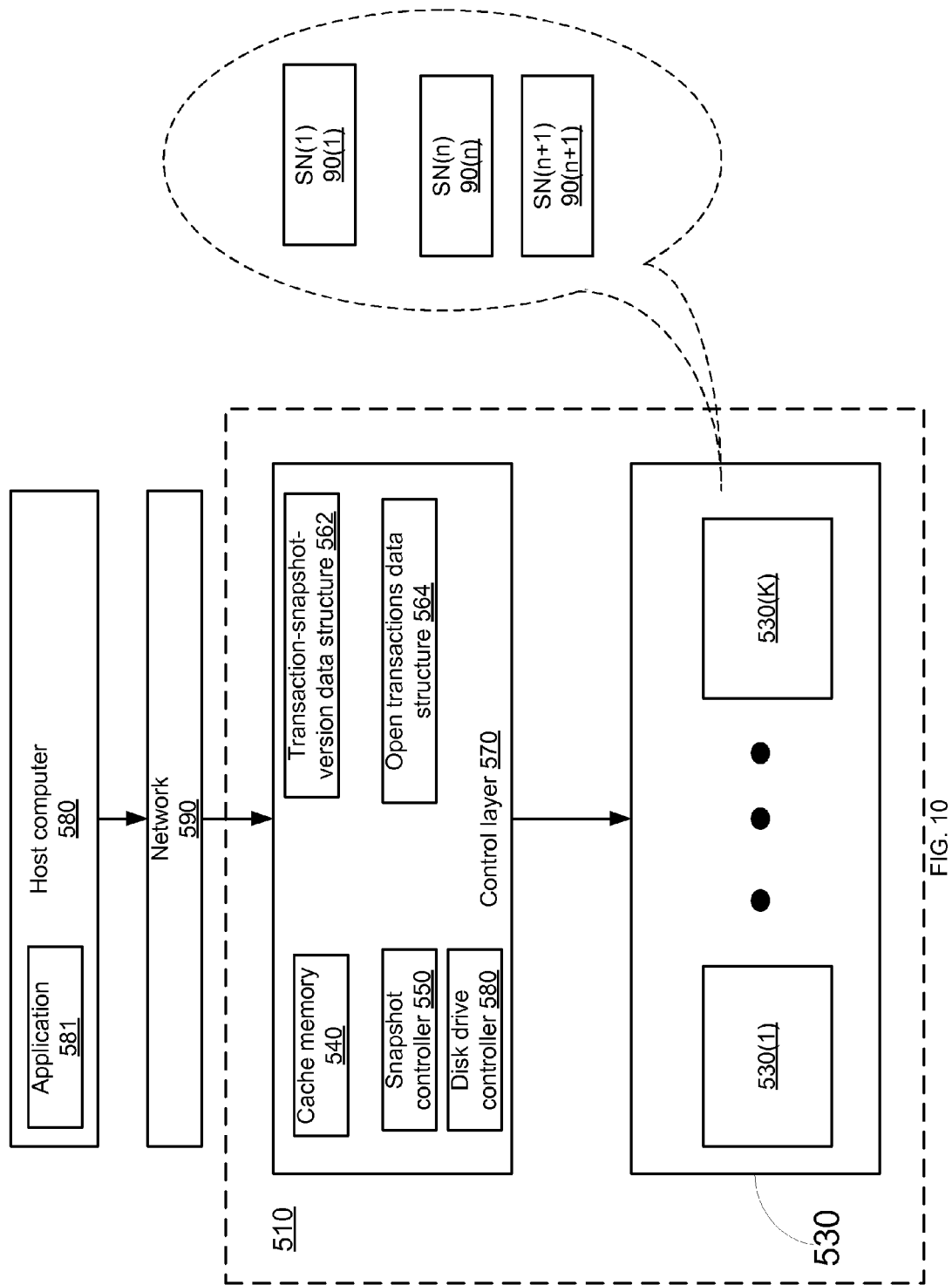
FIG. 10 illustrates a system according to an embodiment of the invention.

FIG. 10 illustrates a storage system 510 and its environment according to an embodiment of the invention.

Storage system 510 is coupled to host computer 580 via network 590. Host computer 580 hosts application 518. The application 581 may generate transactions and may interact with the storage system 510 as illustrated above.

Storage system 510 includes a control layer 570 and a disk drive layer 530. Disk drive layer 530 includes disk drives 530(1)-530(K) and is illustrated as including information that can assist in constructing snapshots such as snapshots SN(1)-SN(n+1) of a certain consistency group. That information can include pointers and/or data deltas. The information can include a mapping data structures for mapping the logical address space of the snapshots into physical addresses in the disk drive layer. The mapped physical addresses can be addresses that stores data shared with other snapshots or logical volumes, as well as data that is uniquely stored as part of a specific snapshot. Alternatively, the mapping data structures can include only mapping corresponding to data uniquely stored as part of a specific snapshot, while the shared data is obtained using a pointer to a logical volume that hosts the shared data. The entire address space of the disk drive layer can be divided into logical volumes and consistency groups of volumes.

Control layer 570 includes cache memory 540, snapshot controller 550, disk drive controller 580 and various data structures such as transaction-snapshot-version data structure 562 that maps transactions (unique transaction identifiers) with the recent version of snapshots aimed to consistency groups. These data structures may also include open transaction data structure 564 that monitors the number of uncompleted transactions per consistency group. The open transaction data structure 564 can include a counter per each consistency group—the counter is increased when a transaction aimed to the consistency group is opened and may be decremented when the transaction is completed.

The disk drive controller 580 controls the interface with the disk drive layer and may be arranged to perform various processes such as load balancing, RAID related algorithms, destage control algorithms for writing cached data to the disk drives, and the like.

The snapshot controller 550 may be arranged to: (a) start a creation of a certain point in time snapshot of a consistency group that comprises at least one logical volume; (b) detect (for example by using open transactions data structure 564) that at the certain point in time there is an uncompleted transaction for writing information units to the consistency group; the uncompleted transaction started at a transaction start point in time; (c) prevent an access to the certain point in time snapshot until a completion of the uncompleted transaction; and (d) associate content that was written during the entire transaction with a first snapshot that is created after the transaction start point in time.

Figure 11:
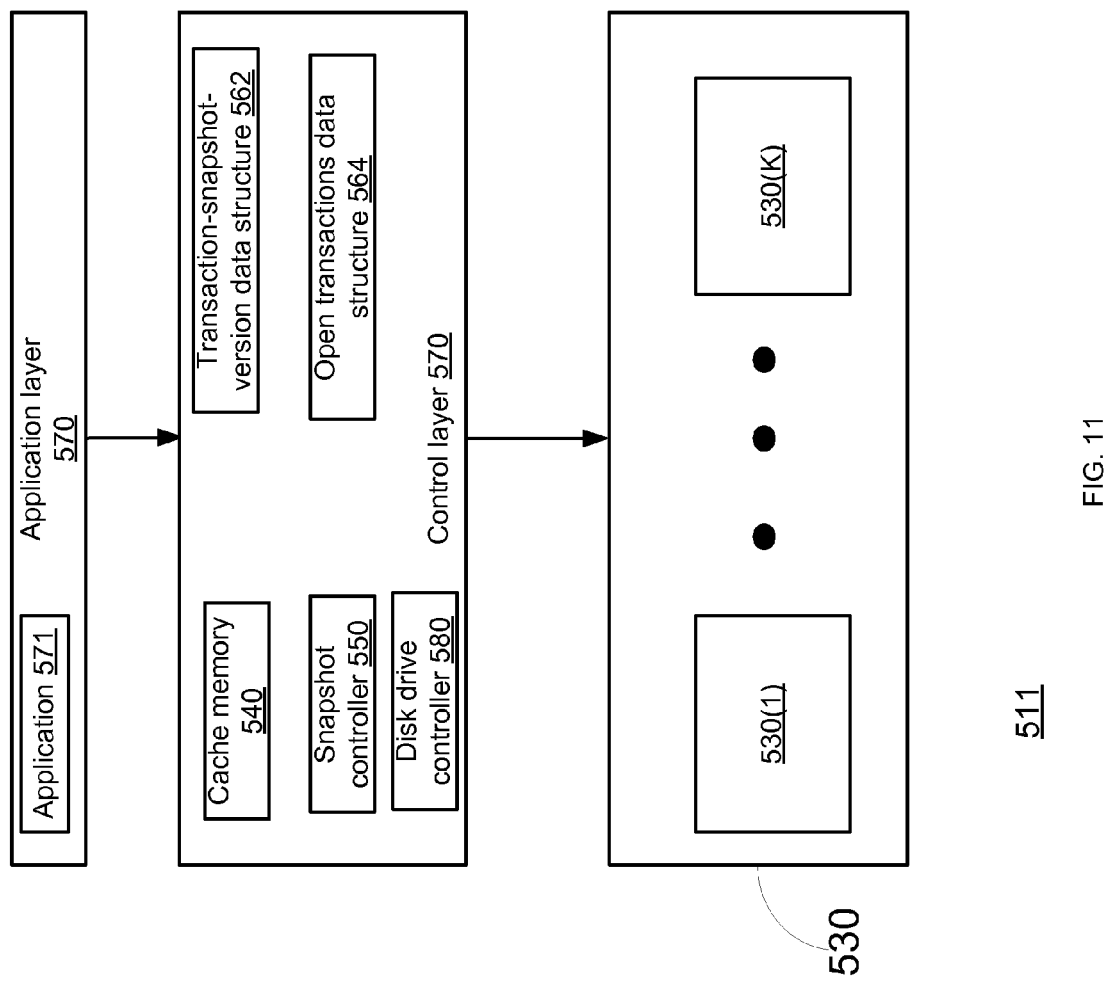
FIG. 11 illustrates a system according to an embodiment of the invention.

FIG. 11 illustrates a storage system 511 according to an embodiment of the invention.

Storage system 511 of FIG. 11 differs from storage system 510 of FIG. 10 by including an application layer 570 that hosts an application 571 that interacts with the control layer as illustrated above.

It is noted that storage system 510 may include such an application layer and that storage system 511 may be coupled to one or more host computers via one or more networks.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for generating transaction aware snapshots, the method comprises:
   starting a creation of a certain point in time snapshot for a consistency group that comprises at least one logical volume;
   detecting that at the certain point in time there is an uncompleted transaction for writing multiple information units to the consistency group; the uncompleted transaction started at a transaction start point in time that precedes the certain point in time;
   preventing an access to the certain point in time snapshot until a completion of the uncompleted transaction;

associating the multiple information units with at least the certain point in time snapshot, so as to include a content of the multiple information units as part of the certain point in time snapshot; and allowing access to the certain point in time snapshot, after the associating of the multiple information units with the at least the certain point in time snapshot.

2. The method according to claim 1, comprising associating the multiple information units with a first snapshot that was created after the transaction start point in time.

3. The method according to claim 1, comprising tagging the multiple information units with at least the certain point in time snapshot.

4. The method according to claim 1, comprising tagging the multiple information units with a most recent snapshot of the consistency group that existed at the transaction start point of time.

5. The method according to claim 4, comprising associating the multiple information units with at least one snapshot of the consistency group that was created after a creation of the most recent snapshot of the consistency group that existed at the transaction start point of time.

6. The method according to claim 1 comprises associating information units, of the multiple information units, that were written to the consistency group after the certain point in time, with the certain point in time snapshot.

7. The method according to claim 1, wherein a first snapshot that is created after the transaction start point in time precedes the certain point in time snapshot; and wherein the method comprises preventing access to the first snapshot that is created after the transaction start point in time and the certain point in time snapshot.

8. The method according to claim 1, comprising preventing by the storage system the access to the certain point in time snapshot until the completion of the uncompleted transaction.

9. The method according to claim 1, wherein the uncompleted transaction was triggered by an application; and the method comprises preventing by the application the access to the certain point in time snapshot until the completion of the uncompleted transaction.

10. The method according to claim 1, comprising detecting that at the certain point in time there are a plurality of uncompleted transactions for writing information units to the consistency group; and preventing the access to the certain point in time snapshot until a completion of each of the plurality of the uncompleted transactions.

11. The method according to claim 1, comprising preventing a blocking of write requests.

12. The method according to claim 1, comprising completing the creation of the certain point of time snapshot.

13. The method according to claim 1, comprising tagging write requests that form the transaction with a most recent snapshot of the consistency group that existed at the transaction start point of time.

14. A non-transitory computer readable medium that stores instructions for:
starting a creation of a certain point in time snapshot for a consistency group that comprises at least one logical volume;
detecting that at the certain point in time there is an uncompleted transaction for writing multiple information units to the consistency group; the uncompleted transaction started at a transaction start point in time that precedes the certain point in time;
preventing an access to the certain point in time snapshot until a completion of the uncompleted transaction;
associating the multiple information units with at least the certain point in time snapshot, so as to include a content of the multiple information units as part of the certain point in time snapshot; and
allowing access to the certain point in time snapshot, after the associating of the multiple information units with the at least the certain point in time snapshot.

15. The non-transitory computer readable medium according to claim 14, that stores instructions for associating the multiple information units with a first snapshot that was created after the transaction start point in time.

16. The non-transitory computer readable medium according to claim 14, that stores instructions for tagging the multiple information units with at least the certain point in time snapshot.

17. The non-transitory computer readable medium according to claim 14, that stores instructions for tagging the multiple information units with a most recent snapshot of the consistency group that existed at the transaction start point of time.

18. The non-transitory computer readable medium according to claim 17, that stores instructions for associating the multiple information units with at least one snapshot of the consistency group that was created after a creation of the most recent snapshot of the consistency group that existed at the transaction start point of time.

19. The non-transitory computer readable medium according to claim 14, that stores instructions for associating information units, of the multiple information units, that were written to the consistency group after the certain point in time, with the certain point in time snapshot.

20. The non-transitory computer readable medium according to claim 14, wherein a first snapshot that is created after the transaction start point in time precedes the certain point in time snapshot; and wherein the non-transitory computer readable medium stores instructions for preventing access to the first snapshot that is created after the transaction start point in time and the certain point in time snapshot.

21. The non-transitory computer readable medium according to claim 14, that stores instructions for preventing by the storage system the access to the certain point in time snapshot until the completion of the uncompleted transaction.

22. The non-transitory computer readable medium according to claim 14, wherein the uncompleted transaction was triggered by an application; and wherein the non-transitory computer readable medium stores instructions for preventing by the application the access to the certain point in time snapshot until the completion of the uncompleted transaction.

23. The non-transitory computer readable medium according to claim 14, that stores instructions for detecting that at the certain point in time there are a plurality of completed transactions for writing information units to the consistency group; and preventing the access to the certain point in time snapshot until a completion of each of the plurality of the uncompleted transactions.

24. The non-transitory computer readable medium according to claim 14, that stores instructions for preventing a blocking of write requests.

25. The non-transitory computer readable medium according to claim 14, that stores instructions for completing the creation of the certain point of time snapshot.

26. The non-transitory computer readable medium according to claim 14, that stores instructions for tagging write requests that form the transaction with a most recent snapshot of the consistency group that existed at the transaction start point of time.

27. A storage system that comprises: a cache memory, a drive disk controller, drive disks and a snapshot controller that is arranged to start a creation of a certain point in time snapshot for a consistency group that comprises at least one logical volume; detect that at the certain point in time there is an uncompleted transaction for writing multiple information units to the consistency group; the uncompleted transaction started at a transaction start point in time that precedes the certain point in time; prevent an access to the certain point in time snapshot until a completion of the uncompleted transaction; associate the multiple information units with at least the certain point in time snapshot, so as to include a content of the multiple information units as part of the certain point in time snapshot; and allow access to the certain point in time snapshot, after the association of the multiple information units with the at least the certain point in time snapshot.

* * * * *